(12) United States Patent
Kamath et al.

(10) Patent No.: US 8,964,601 B2
(45) Date of Patent: Feb. 24, 2015

(54) NETWORK SWITCHING DOMAINS WITH A VIRTUALIZED CONTROL PLANE

(71) Applicant: International Business Machines Corporation, Armonk, NY (US)

(72) Inventors: Dayavanti Gopal Kamath, Santa Clara, CA (US); Keshav Govind Kamble, Fremont, CA (US); Dar-Ren Leu, San Jose, CA (US); Vijoy A. Pandey, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 97 days.

(21) Appl. No.: 13/646,378

(22) Filed: Oct. 5, 2012

(65) Prior Publication Data

US 2013/0089089 A1 Apr. 11, 2013

Related U.S. Application Data

(60) Provisional application No. 61/544,457, filed on Oct. 7, 2011.

(51) Int. Cl.
| | |
|---|---|
| H04L 12/28 | (2006.01) |
| H04W 4/00 | (2009.01) |
| H04L 12/50 | (2006.01) |
| H04Q 11/00 | (2006.01) |
| H04L 12/413 | (2006.01) |

(52) U.S. Cl.
CPC .................................. *H04L 12/413* (2013.01)
USPC ........... 370/254; 370/328; 370/357; 370/358; 370/401

(58) Field of Classification Search
None
See application file for complete search history.

(56) References Cited

U.S. PATENT DOCUMENTS

| | | |
|---|---|---|
| 5,226,120 A | 7/1993 | Brown et al. |
| 5,522,042 A | 5/1996 | Fee et al. |
| 5,751,967 A | 5/1998 | Raab et al. |
| 6,205,122 B1 | 3/2001 | Sharon et al. |
| 6,597,689 B1 | 7/2003 | Chiu et al. |
| 6,856,591 B1 | 2/2005 | Ma et al. |

(Continued)

FOREIGN PATENT DOCUMENTS

| | | |
|---|---|---|
| CN | 101098260 A | 1/2008 |
| CN | 102082690 A | 6/2011 |

(Continued)

OTHER PUBLICATIONS

Aureglia, JJ, et al., "Power Backup for Stackable System", IP.com, Dec. 1, 1995, 5 pages.

(Continued)

*Primary Examiner* — Faruk Hamza
*Assistant Examiner* — Diane Lo
(74) *Attorney, Agent, or Firm* — Schmeiser, Olsen & Watts LLP; Michael Rodriguez (57) ABSTRACT

A distributed switching fabric system includes multiple network switches coupled to a cell-based switching fabric by cell-fabric ports. A virtual machine runs on a server connected to a network port of one or more of the network switches that are members of a given switching domain. The virtual machine manages a control plane for the given switching domain. The server receives a protocol control packet from one of the network switches and forwards the received protocol control packet to the virtual machine for processing.

25 Claims, 8 Drawing Sheets

(56) References Cited

U.S. PATENT DOCUMENTS

| | | | |
|---|---|---|---|
| 6,880,086 B2 | 4/2005 | Kidder et al. | |
| 6,934,749 B1 | 8/2005 | Black et al. | |
| 7,020,696 B1 | 3/2006 | Perry et al. | |
| 7,095,744 B2 | 8/2006 | Iny | |
| 7,133,403 B1 | 11/2006 | Mo et al. | |
| 7,143,153 B1 | 11/2006 | Black et al. | |
| 7,225,244 B2 | 5/2007 | Reynolds et al. | |
| 7,230,917 B1 | 6/2007 | Fedorkow et al. | |
| 7,240,364 B1 | 7/2007 | Branscomb et al. | |
| 7,263,597 B2 | 8/2007 | Everdell et al. | |
| 7,266,595 B1 | 9/2007 | Black et al. | |
| 7,295,566 B1 | 11/2007 | Chiu et al. | |
| 7,299,290 B2 | 11/2007 | Karpoff | |
| 7,305,492 B2 | 12/2007 | Bryers et al. | |
| 7,349,960 B1 | 3/2008 | Pothier et al. | |
| 7,369,540 B1 | 5/2008 | Giroti | |
| 7,406,038 B1 | 7/2008 | Oelke et al. | |
| 7,441,154 B2 | 10/2008 | Klotz et al. | |
| 7,492,779 B2 | 2/2009 | Schzukin et al. | |
| 7,693,976 B2 | 4/2010 | Perry et al. | |
| 7,765,328 B2 | 7/2010 | Bryers et al. | |
| 7,818,387 B1 | 10/2010 | King et al. | |
| 7,827,248 B2 | 11/2010 | Oyadomari et al. | |
| 7,921,686 B2 | 4/2011 | Bagepalli et al. | |
| 8,194,534 B2 | 6/2012 | Pandey et al. | |
| 8,265,071 B2 | 9/2012 | Sindhu et al. | |
| 8,335,213 B2 | 12/2012 | Sindhu et al. | |
| 8,340,088 B2 | 12/2012 | Sindhu et al. | |
| 8,345,675 B1 | 1/2013 | Raghunath | |
| 8,358,660 B2 | 1/2013 | Pacella et al. | |
| 8,477,730 B2 | 7/2013 | Rajagopalan et al. | |
| 8,537,829 B2 | 9/2013 | Mehta | |
| 8,687,629 B1 | 4/2014 | Kompella et al. | |
| 8,773,999 B2 | 7/2014 | Campbell et al. | |
| 8,780,931 B2 | 7/2014 | Anantharam et al. | |
| 8,789,164 B2 | 7/2014 | Kamble et al. | |
| 2002/0001307 A1 | 1/2002 | Nguyen et al. | |
| 2002/0057018 A1 | 5/2002 | Branscomb et al. | |
| 2002/0080780 A1 | 6/2002 | McCormick et al. | |
| 2002/0116485 A1 | 8/2002 | Black et al. | |
| 2002/0141427 A1 | 10/2002 | McAlpine | |
| 2002/0165961 A1 | 11/2002 | Everdell et al. | |
| 2003/0120822 A1 | 6/2003 | Langrind et al. | |
| 2003/0126195 A1 | 7/2003 | Reynolds et al. | |
| 2003/0169748 A1 | 9/2003 | Weyman et al. | |
| 2004/0031030 A1 | 2/2004 | Kidder et al. | |
| 2004/0119735 A1 | 6/2004 | Subbarao et al. | |
| 2005/0063354 A1 | 3/2005 | Garnett et al. | |
| 2005/0089054 A1 | 4/2005 | Ciancaglini et al. | |
| 2005/0105538 A1 | 5/2005 | Perera et al. | |
| 2005/0135357 A1 | 6/2005 | Riegel et al. | |
| 2005/0141499 A1 | 6/2005 | Ma et al. | |
| 2005/0141523 A1 | 6/2005 | Yeh et al. | |
| 2005/0198247 A1 | 9/2005 | Perry et al. | |
| 2005/0198373 A1 | 9/2005 | Saunderson et al. | |
| 2006/0092832 A1 | 5/2006 | Santoso et al. | |
| 2006/0098672 A1 | 5/2006 | Schzukin et al. | |
| 2007/0083528 A1 | 4/2007 | Matthews et al. | |
| 2007/0121499 A1 | 5/2007 | Pal et al. | |
| 2007/0136458 A1 | 6/2007 | Boyd et al. | |
| 2007/0147279 A1 | 6/2007 | Smith et al. | |
| 2007/0266384 A1 | 11/2007 | Labrou et al. | |
| 2008/0170578 A1 | 7/2008 | Ould-Brahim | |
| 2008/0275975 A1 | 11/2008 | Pandey et al. | |
| 2009/0059957 A1 | 3/2009 | Bagepalli et al. | |
| 2009/0129398 A1 | 5/2009 | Riegel et al. | |
| 2009/0157844 A1 | 6/2009 | Fionda et al. | |
| 2009/0157884 A1 | 6/2009 | Anderson et al. | |
| 2009/0198836 A1 | 8/2009 | Wittenschlaeger | |
| 2009/0228418 A1 | 9/2009 | Ramesh et al. | |
| 2010/0061240 A1 | 3/2010 | Sindhu et al. | |
| 2010/0061241 A1 | 3/2010 | Sindhu et al. | |
| 2010/0061242 A1 | 3/2010 | Sindhu et al. | |
| 2010/0061367 A1 | 3/2010 | Sindhu et al. | |
| 2010/0061389 A1 | 3/2010 | Sindhu et al. | |
| 2010/0061391 A1 | 3/2010 | Sindhu et al. | |
| 2010/0061394 A1 | 3/2010 | Sindhu et al. | |
| 2010/0162036 A1 | 6/2010 | Linden et al. | |
| 2010/0169446 A1 | 7/2010 | Linden et al. | |
| 2010/0182934 A1 | 7/2010 | Dobbins et al. | |
| 2010/0214949 A1* | 8/2010 | Smith et al. | 370/254 |
| 2010/0303086 A1 | 12/2010 | Bialkowski | |
| 2010/0315972 A1 | 12/2010 | Plotnik et al. | |
| 2011/0047467 A1 | 2/2011 | Porter | |
| 2011/0093574 A1 | 4/2011 | Koehler et al. | |
| 2011/0103259 A1* | 5/2011 | Aybay et al. | 370/254 |
| 2011/0116376 A1 | 5/2011 | Pacella et al. | |
| 2011/0179315 A1 | 7/2011 | Yang | |
| 2011/0228669 A1 | 9/2011 | Lei et al. | |
| 2011/0238816 A1* | 9/2011 | Vohra et al. | 709/224 |
| 2012/0002670 A1 | 1/2012 | Subramanian et al. | |
| 2012/0020373 A1 | 1/2012 | Subramanian et al. | |
| 2012/0063464 A1 | 3/2012 | Mehta | |
| 2012/0155453 A1 | 6/2012 | Vohra et al. | |
| 2012/0170548 A1 | 7/2012 | Rajagopalan et al. | |
| 2012/0287926 A1 | 11/2012 | Anantharam et al. | |
| 2012/0294314 A1 | 11/2012 | Campbell et al. | |
| 2012/0297103 A1 | 11/2012 | Kamble et al. | |
| 2012/0324442 A1* | 12/2012 | Barde | 718/1 |
| 2013/0060929 A1 | 3/2013 | Koponen et al. | |
| 2013/0064102 A1 | 3/2013 | Chang et al. | |
| 2013/0088971 A1 | 4/2013 | Anantharam et al. | |
| 2013/0103817 A1 | 4/2013 | Koponen et al. | |
| 2013/0107709 A1 | 5/2013 | Campbell et al. | |
| 2013/0107713 A1 | 5/2013 | Campbell et al. | |
| 2013/0142196 A1 | 6/2013 | Cors et al. | |
| 2013/0201873 A1 | 8/2013 | Anantharam et al. | |
| 2013/0201875 A1 | 8/2013 | Anantharam et al. | |
| 2013/0235735 A1 | 9/2013 | Anantharam et al. | |
| 2013/0235762 A1 | 9/2013 | Anantharam et al. | |
| 2013/0235763 A1 | 9/2013 | Anantharam et al. | |
| 2013/0242999 A1 | 9/2013 | Kamble et al. | |
| 2013/0247168 A1 | 9/2013 | Kamble et al. | |
| 2013/0315233 A1 | 11/2013 | Kamble et al. | |
| 2013/0315234 A1 | 11/2013 | Kamble et al. | |
| 2014/0064105 A1 | 3/2014 | Anantharam et al. | |

FOREIGN PATENT DOCUMENTS

| | | |
|---|---|---|
| JP | 200971619 | 4/2009 |
| JP | 2009542053 | 11/2009 |

OTHER PUBLICATIONS

"Control Plane Scaling and Router Virtualization", Juniper Networks, 2010; 12 pages.

IBM, "A Non-invasive Computation-assist Device for Switching Fabrics in a High-Performance Computing System", IP.com, Aug. 30, 2007, 5 pages.

Ni, Lionel M., et al., "Switches and Switch Interconnects", Michigan State University, Jun. 1997; 8 pages.

Rogerio, Drummond, "Impact of Communication Networks on Fault-Tolerant Distributed Computing", IP.com, Apr. 20, 1986, 53 pages.

Tate, J. et al., "IBM b-type Data Center Networking: Design and Best Practices Introduction", IBM Redbooks; Dec. 2010; 614 pages.

Non-Final Office Action in related U.S. Appl. No. 13/364,896, mailed on Nov. 21, 2013; 33 pages.

Non-Final Office Action in related U.S. Appl. No. 13/453,644, mailed on Nov. 25, 2013; 16 pages.

Final Office Action in related U.S. Appl. No. 13/453,644, mailed on May 21, 2014; 14 pages.

Final Office Action in related U.S. Appl. No. 13/364,896, mailed on Jun. 4, 2014; 34 pages.

Examination Report in related United Kingdom patent application No. 1412787.2, mailed on Aug. 26, 2014; 3 pages.

Non-Final Office Action in related U.S. Appl. No. 13/453,644, mailed on Sep. 10, 2014; 26 pages.

International Search Report & Written Opinion in related international patent application No. PCT/IB2013/050428, mailed on Jun. 20, 2013; 9 pages.

(56) References Cited

OTHER PUBLICATIONS

Allen, D., "From the Data Center to the Network: Virtualization bids to remap the LAN", Network Magazine, vol. 19, No. 2, Feb. 2004; 5 pages.
Ayandeh, Siamack, "A Framework for Benchmarking Performance of Switch Fabrics", 10th Annual International Conference on Telecommunication, IEEE Conference Proceedings, vol. 2, 2003; pp. 1650-1655.
Brey et al., "BladeCenter Chassis Management", IBM J. Res. & DEV. vol. 49, No. 6, Nov. 2005; pp. 941-961.
Cisco, "Chapter 4: Switch Fabric", Cisco CRS Carrier Routing System 16-Slot Line Card Chassis System Description, Cisco.com, accessed Jan. 2012; 6 pages.
Coti et al., "MPI Applications on Grids: a Topology Aware Approach", Euro-Par, Paralell Processing, Lecture Notes in Computer Science, 2009, University of Paris, Orsay, France; 12 pages.
International Search Report and Written Opinion in related international application No. PCT/IB2013/051339, mailed on May 21, 2013; 8 pages.
Kandalla et al., "Designing Topology-Aware Collective Communication Algorithms for Large Scale Infiniband Clusters: Case Studies with Scatter and Gather", IEEE International Symposium on Parallel & Distributed Processing, Workshops and PhD Forum, 2010; 8 pages.
Lawrence et al., "An MPI Tool for Automatically Discovering the Switch Level Topologies of Ethernet Clusters", IEEE International Symposium on Parallel and Distributed Processing, Apr. 2008, Miami, FL; 8 pages.
Malavalli, Kumar, "High Speed Fibre Channel Switching Fabric Services", SPIE Conference on High-Speed Fiber Networks and Channels, Boston, MA (USA), Sep. 1991; 11 pages.
Shunsuke Fujita et al., Effect of application order of topology inference rule for Layer2 Network Topology visualizing System, IPSJ SIG Technical Reports, Feb. 26, 2009, vol. 2009, No. 21, p. 185-190. (Tanslation of abstract only.).
Takafumi Hamano et al., Packet forwarding control functions of an Open Architecture Router, IEICE Technical Report, Jun. 16, 2005, vol. 105, No. 127, p. 45-48. (Translation of abstract only.).
Teow, K., "Definitions of Managed Objects for the Fabric Element in Fibre Channel Standard (RFC2837)", IP.com, May 1, 2000; 41 pages.
Non-Final Office Action in related U.S. Appl. No. 13/454,987, mailed on May 19, 2014; 16 pages.
Non-Final Office Action in related U.S. Appl. No. 12/414,677, mailed on May 20, 2014; 14 pages.
Non-Final Office Action in related U.S. Appl. No. 13/414,687, mailed on Jun. 4, 2014; 21 pages.
Non-Final Office Action in related U.S. Appl. No. 14/072,941, mailed on Jul. 31, 2014; 19 pages.
Notice of Allowance in related U.S. Appl. No. 13/454,987, mailed on Sep. 23, 2014; 10 pages.
Notice of Allowance in related U.S. Appl. No. 13/414,677, mailed on Oct. 24, 2014; 9 pages.
Notice of Allowance in related U.S. Appl. No. 13/414,684, mailed on Oct. 24, 2014; 9 pages.
Notice of Allowance in related U.S. Appl. No. 13/414,684, mailed on Dec. 3, 2014; 9 pages.
Notice of Allowance in related U.S. Appl. No. 13/414,677, mailed on Dec. 3, 2014; 10 pages.
Non-Final Office Action in related U.S. Appl. No. 13/364,896, mailed on Nov. 19, 2014; 45 pages.

\* cited by examiner

NETWORK SWITCHING DOMAINS WITH A VIRTUALIZED CONTROL PLANE

RELATED APPLICATION

This application claims priority to and the benefit of U.S. Provisional Application Ser. No. 61/544,457, filed Oct. 7, 2011, titled "Mechanism to Virtualize Control Planes of Network Switches," the entirety of which application is incorporated by reference herein.

FIELD OF THE INVENTION

The invention relates generally to data centers and data processing. More particularly, the invention relates to methods and apparatus for virtualizing the control plane of a network switching domain.

BACKGROUND

Data centers are generally centralized facilities that provide Internet and intranet services in support of businesses and organizations. A typical data center can house various types of electronic equipment, such as computers, servers (e.g., email servers, proxy servers, and DNS servers), switches, routers, data storage devices, and other associated components. A given data center can be made of different types of switching domains. One type of switching domain can comprise a group of cell-based switches connected to a cell-based switching fabric and managed as a single traffic management domain. Depending on the kind of switches, the single switching domain can scale up to hundreds of thousands of Ethernet ports. Managed together, all of these switches form one virtual, large, flat (i.e., without hierarchy) switch. Traditionally, each switch runs control plane software, which can limit the scaling and performance of the control plane for the switching domain.

SUMMARY

In one aspect, the invention features a method for implementing a control plane in a distributed fabric system comprised of one or more switching domains. The distributed fabric system includes a plurality of network switches coupled to a cell-based switching fabric. The method comprises running a virtual machine on a server connected to a network port of one or more of the network switches of the distributed fabric system that are members of a given switching domain. The virtual machine running on the server manages a control plane for the given switching domain. The server receives a protocol control packet from one of the network switches. The received protocol control packet is forwarded to the virtual machine running on the server for processing.

In another aspect, the invention features a distributed fabric system comprising a plurality of scaled-out fabric coupler (SFC) chassis. Each SFC chassis has a plurality of cell-based SFC fabric ports and a cell-based fabric element for switching cells among the cell-based SFC fabric ports of that SFC chassis. The distributed fabric system further comprises a plurality of switching distributed line cards (DLCs). Each switching DLC has a plurality of network ports and a plurality of DLC fabric ports. Each switching DLC is connected to each of the SFC chassis by one of the DLC fabric ports of that switching DLC. At least one of the DLCs belongs to a switching domain. A server, connected to one of the network ports of the at least one DLC belonging to the switching domain, runs a control plane virtual machine that manages a control plane for the switching domain.

In still another aspect, the invention features a server system comprising a physical network interface card (NIC) connected to a network port of a given network switch of a cell-based distributed fabric system comprised of a plurality of network switches coupled to a cell-based switching fabric. The given network switch belongs to a switching domain within the cell-based distributed fabric system. A hypervisor, in communication with the physical NIC, includes a plurality of virtual NICs. A processor runs a control plane virtual machine (VM) associated with one of the virtual NICs. The control plane VM manages a control plane for the switching domain.

In yet another aspect, the invention features a network switch comprising a central processing unit (CPU), and a switching chip having a plurality of network ports. The switching chip has logic configured to detect and forward protocol control packets received by the network switch to the CPU through a local CPU port, logic configured to reprogram the local CPU port to be a network port, and logic to forward protocol control packets to the network port rather than to the CPU.

In still yet another aspect, the invention features a computer program product for implementing a control plane in a distributed fabric system comprised of one or more switching domains. The distributed fabric system includes a plurality of network switches coupled to a switching fabric by cell-based fabric ports. The computer program product comprises a computer-readable storage medium having computer-readable program code embodied therewith.

The computer-readable program code comprises computer-readable program code configured to provide a virtual machine when executed on a server system, computer-readable program code configured to manage, by the virtual machine when executed, a control plane for a given switching domain of the distributed fabric system, computer-readable program code configured to receive a protocol control packet from one of the network switches; and computer-readable program code configured to forward the received protocol control packets to the virtual machine when executing on the server system and managing the control plane for the given switching domain.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Data centers can include a cell-based distributed fabric system comprised of a plurality of switches (called Distributed Line Cards or DLCs) coupled to distributed switching fabric boxes (called Scaled up Fabric Coupler or SFCs) by cell-based fabric ports. These DLCs and SFCs can form a single large traffic management domain. The distributed fabric system can be operated as a single switching domain or be partitioned into multiple non-overlapping switching domains. Each switching domain can have a server that is connected to one of the DLCs in that switching domain and that runs the control plane for that switching domain. On the server, the control plane and operating system run as a virtual machine (VM) on a hypervisor. Other hypervisors may coexist on the server.

In brief, to implement the control plane on the server, each DLC and SFC communicates with its own local CPU so that protocol control packets are forwarded to one or more network ports rather than to a local PCIe port, each DLC forwards all protocol control packets to the server for processing, and the control plane on the server sends unicast and multicast packets to the network ports of the DLCs for forwarding.

Advantageously, the server generally has more processing resources, such as processors and memory, than a switch, and thus is better suited for the demands of control packet processing associated with running a control plane. In addition, running the control plane at a server provides greater scalability and performance than the traditional technique of running the control plane software on a CPU embedded on the switch. Further, running the control plane on the server facilitates the implementation of independent control planes and management planes in a distributed fabric system that is partitioned into multiple switching domains. The independent control planes facilitates the establishment of hosted data centers, where server racks and the Top of Rack switches can be dedicated to individual customers.

Figure 1:
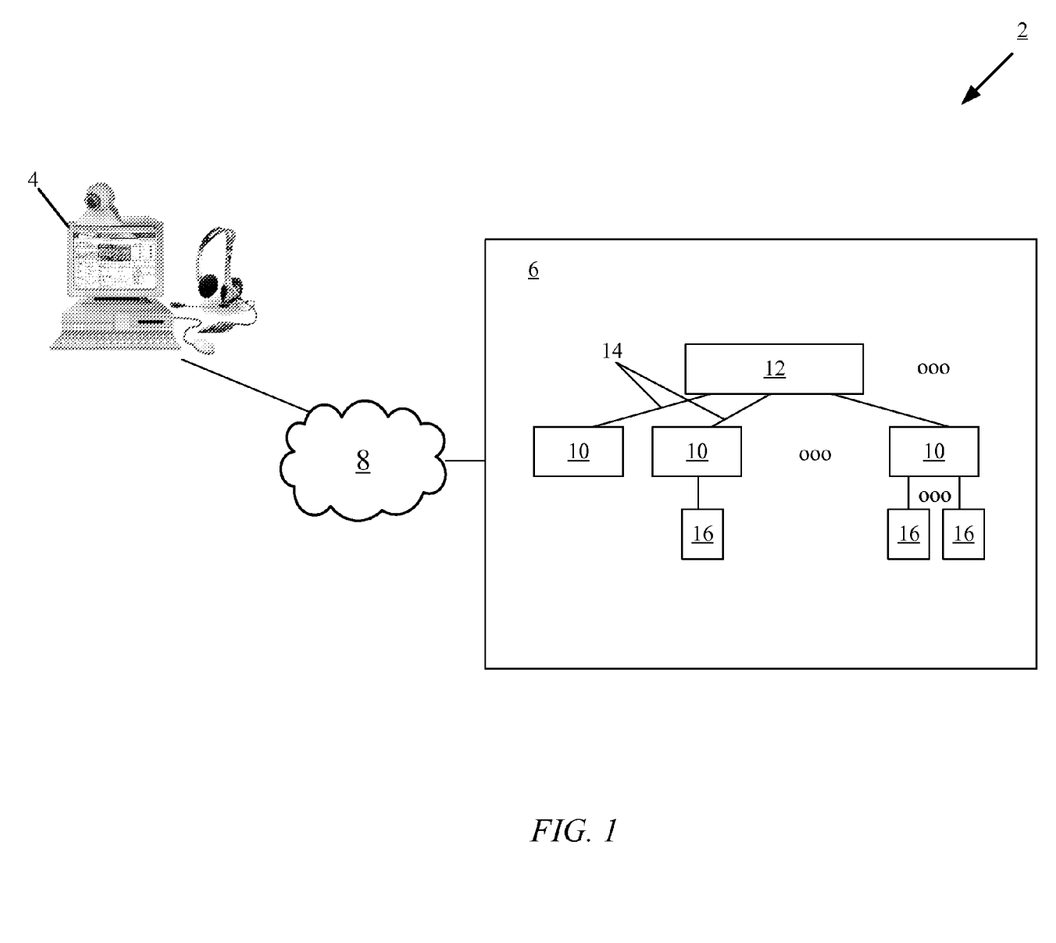
FIG. 1 is an embodiment of a networking environment including a data center with a distributed fabric system.

FIG. 1 shows an embodiment of a networking environment 2 including a management station 4 in communication with a data center 6 over a network 8. In general, the data center 6 is a facility that houses various computers, routers, switches, and other associated equipment in support of applications and data that are integral to the operation of a business, organization, or other entities. The data center 6 may be embodied at a single site or distributed among multiple sites. Embodiments of the network 8 include, but are not limited to, local-area networks (LAN), metro-area networks (MAN), and wide-area networks (WAN), such as the Internet or World Wide Web.

In this illustrative example, the data center 6 includes a group of cell-based switches 10, also referred to herein as distributed line card (DLC) chassis, in communication with one or more scaled-out fabric coupler (SFC) chassis 12 over communication links 14. Each SFC chassis 12 has one or more cell-based switch fabric elements (not shown) for switching cells among the switches 10. The one or more SFC chassis 12 provide a cell-based switching fabric for the DLCs 10. The DLCs 10 and SFCs 12 together embody a cell-based distributed fabric system that can operate as a single switching domain, or be partitioned into multiple non-overlapping switching domains, as described in U.S. application Ser. No. 13/646,329, filed on Oct. 5, 2012, and titled "Partitioning Large Flat Data Centers into Multiple Switching Domains," the entirety of which application is incorporated by reference herein.

Connected to each of the DLCs 10 are zero, one, or more servers 16. In general, a server 16 is a computer (or group of computers) that provides one or more services to the data center 6, examples of which include, but are not limited to, email servers, proxy servers, DNS servers, control plane servers, and management plane servers. A given server 16 can be attached to more than one DLC 10.

In the data center 6, the functionality of a switching domain occurs generally on three planes: a management plane, a control plane, and a data plane. The management of each switching domain, such as configuration management, runtime configuration management, presentation of information (show and display), graph generation, and handling SNMP (Simple Network Management Protocol) requests, occurs on the management plane. The control plane is associated with those functions involving network signaling and control. In general, the control plane contains the logic used to program the data plane, so that packets are forwarded correctly throughout the distributed fabric system. The data plane manages data flow. In the data center 6, the functionality of the management plane and/or control plane of each switching domain is centrally implemented at one the servers 16 of that switching domain, as described further herein. The functionality of the data plane is distributed among the DLCs 10.

The management station 4 can provide a centralized point of administration for managing and controlling the DLCs 10 and the SFCs 12. Through a management station 4, a user or network administrator of the data center 6 can access the control plane and/or management plane running on a server 16 in order to manage a particular switching domain. A graphical user interface (GUI) application executing on a customer system 4 can serve to provide the network administrator with a view of the entire network topology of a switching domain. An example of such a GUI application is Blade Harmony Manager® provided by IBM Corporation of Armonk, N.Y. Although shown outside of the data center 6, the management station 4 may be considered part of the data center 6.

The management station 4 can connect directly (point-to-point) or indirectly to a given DLC 10 of the data center 6 over one of a variety of connections, such as standard telephone lines, digital subscriber line (DSL), asynchronous DSL, LAN or WAN links (e.g., T1, T3), broadband connections (Frame Relay, ATM), and wireless connections (e.g., 802.11(a), 802.11(b), 802.11(g), 802.11(n)). Using a network protocol, such as Telnet, the management station 4 can access a command-line interface (CLI) of a given DLC 10 or the control plane and/or management plane of a switching domain running on a server 16.

Figure 2:
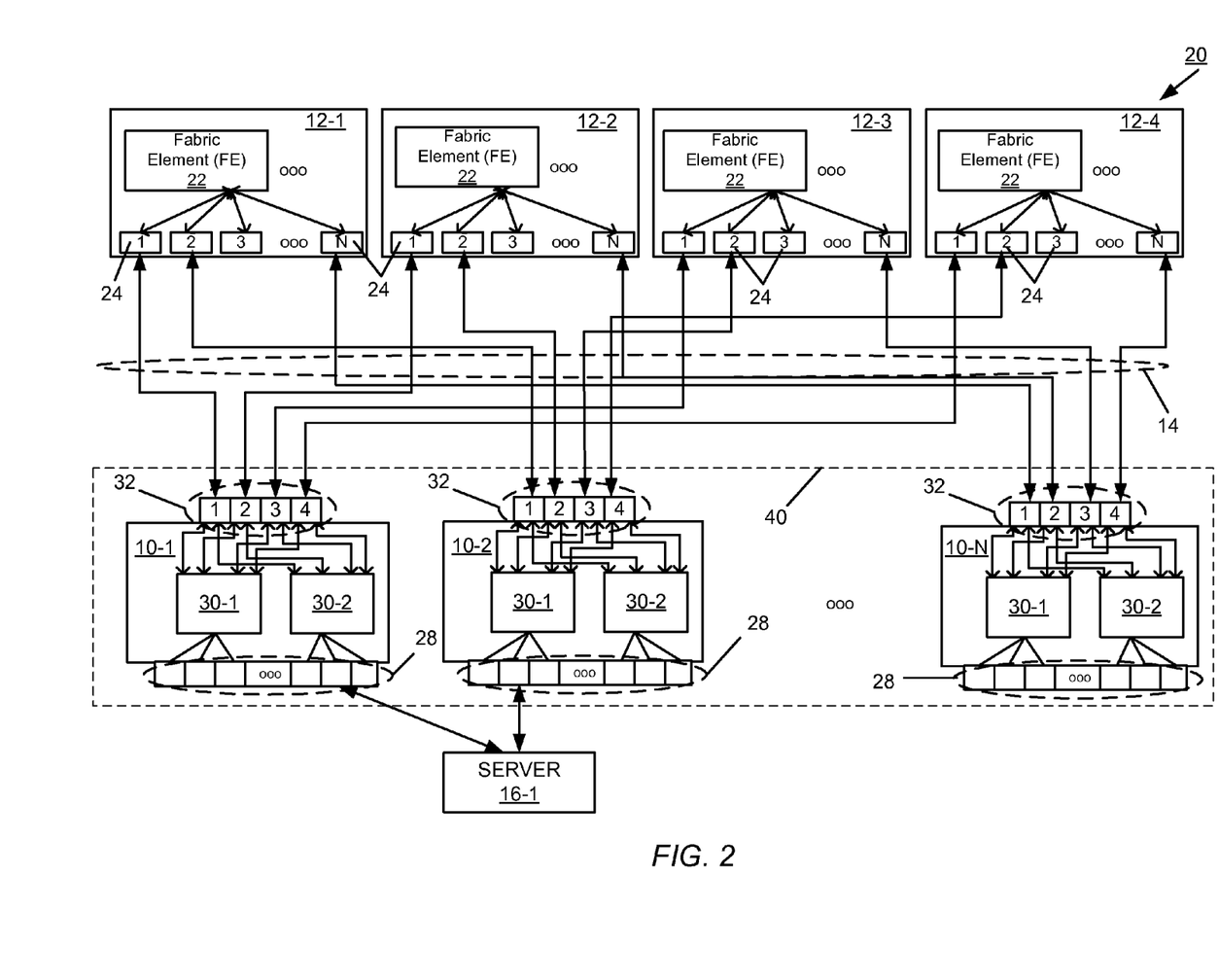
FIG. 2 is a block diagram of an embodiment of the distributed fabric system including a plurality of scaled-out fabric coupler (SFC) chassis interconnected with a plurality of switches.

FIG. 2 shows an example embodiment of a cell-based distributed fabric system 20 having four independent SFC chassis 12-1, 12-2, 12-3, and 12-4 (generally, 12) in communication with a plurality of cell-based switches or DLCs 10-1, 10-2, 10-N (generally, 10). The number (N) of DLCs 10 can range in the hundreds and thousands. As an example, four 256-fabric port SFC chassis 12 together can connect up to 256 DLCs.

Each SFC chassis 12 includes a set of cell-based switch fabric elements (FE) 22 in communication with N SFC fabric ports 24, there being at least as many SFC fabric ports 24 in each SFC chassis 12 as the number of DLCs 10 in the distributed fabric system 20. Each set of fabric elements 22 corresponds to a CLOS of fabric elements of an SFC chassis 12 that switches cells between fabric ports 24 based on the destination information in the cell header. An example implementation of the switch fabric elements 22 is the BCM 88750, produced by Broadcom, of Irvine, Calif.

Each DLC 10 has network-facing ports 28, network processors 30-1, 30-2 (generally, 30), and fabric-facing ports 32. The network-facing (or network) ports 28 can be in communication with servers 16, with external switching domains, and with the network 8, for example, the Internet. In one embodiment, each DLC 10 has forty network ports 28, with each of the network ports 28 being configured as a 10 Gbps Ethernet port (the aggregate network bandwidth of the DLC 10 is 400 Gbps) that receives Ethernet packets. An example implementation of the network processors 30 is the BCM 88650, produced by Broadcom, of Irvine, Calif.

In this example, the distributed fabric system 20 has a full-mesh configuration: each DLC 10 is in communication with each of the SFCs 12; more specifically, each of the fabric-facing ports 32 (hereafter, switch fabric port 32) of a given DLC 10 is in electrical communication with an SFC fabric port 24 of a different one of the SFCs 12 over a communication link 14. Referring to the DLC 10-1 as a representative example, the switch fabric port 32-1 of the DLC 10-1 is in communication with the fabric port 24-1 of the SFC 12-1, the switch fabric port 32-2 with the SFC fabric port 24-1 of the SFC 12-2, the switch fabric port 32-3 with the SFC fabric port 24-1 of the SFC 12-3, and the switch fabric port 32-4 with the SFC fabric port 24-1 of the SFC 12-4. Connected in this full-mesh configuration, the DLCs 10 and SFCs 12 form a distributed virtual chassis or virtual flat switch, with the DLCs 10 acting as line cards. Such a distributed virtual chassis is modular; that is, DLCs 10 can be added to or removed from the distributed virtual chassis, one at a time, like line cards added to or removed from a physical chassis.

The communication link 14 between each switch fabric port 32 and an SFC fabric port 24 can be a wired connection. Interconnect variants include Direct Attached Cable (DAC) or optical cable. DAC provides five to seven meters of cable length; whereas the optical cable offers up to 100 meters of connectivity within the data center, (standard optical connectivity can exceed 10 km). Alternatively, the communication link 14 can be a direct physical connection (i.e., electrical connectors of the switch fabric ports 32 physically connect directly to electrical connectors of the SFC fabric ports 24).

During operation of the distributed fabric system 20, packets arrive at the network ports 28 of the DLCs 10. For each received packet, one of the network processors 30 of the DLC 10 adds metadata/pre-classification header to the packet. The network processor 30 then partitions the packet into one or more fixed-size cells (e.g., 256 bytes). The network processor 30 sends the cells out through the switch fabric ports 32 to each of the SFCs 12, sending different cells to different SFCs 12. For example, consider an incoming packet with a length of 1600 bytes. The receiving network processor 30 of the DLC 10 can split the packet into four cells of 400 bytes (before adding header information—e.g., 10 bytes—to those cells). The network processor 30 then sends a different cell to each of the four SFCs 12, in effect, achieving a load balancing of the cells across the SFCs 12.

In each SFC 12, a cell-based switch fabric element 22 receives a cell and examines the header of that cell, determines its destination, and sends the cell out through the appropriate one of the SFC fabric ports 24 of that SFC to the destination DLC 10. The destination DLC 10 receives all cells related to the original packet from the SFCs 12, reassembles the original packet (i.e., removing the added headers, combining cells), and sends the reassembled packet out through the appropriate one of its network ports 28. Continuing with the previous four-cell example, consider that each SFC determines that the destination DLC 10 is DLC 10-2. Each SFC 12 sends its cell out through its fabric port 24-2 to the DLC 10-2. The DLC 10-2 reassembles the packet from the four received cells (the added headers providing an order in which to combine the cells) and sends the packet out of the appropriate network port 28. The pre-classification header information in the cells determines the appropriate network port 28.

The full-mesh configuration of FIG. 2, having the four SFC chassis 12, is a full-line rate configuration, that is, the aggregate bandwidth for transmitting cells from a given DLC 10 to the SFCs (i.e., 480 Gbps) is greater than the aggregate bandwidth of packets arriving at the given DLC 10 on the network ports 28 (i.e., 400 Gbps). The configuration can also be adapted to support various oversubscription permutations for DLCs 10. For example, instead of having four SFCs 12, the distributed fabric system 20 may have only two SFC chassis 12-1, 12-2, with each DLC 10 using only two switch fabric ports 32 for communicating with the SFC chassis 12, one switch fabric port 32 for each of the two SFC chassis 12. This permutation of oversubscription has, for example, each DLC 10 on its network side with an aggregate ingress 400 Gbps bandwidth (forty 10 Gbps Ethernet Ports) and an aggregate egress 240 Gbps cell-switching bandwidth on its two 120 Gbps switch fabric ports 32 for communicating with the two SFCs 12. Other oversubscription permutations can be practiced.

In one embodiment, the DLCs 10 of the distributed fabric system 20 are configured as a single switching domain 40 that includes all of the DLCs 10. In this embodiment, the management and/or control planes run on a control plane server 16-1 (or controller) connected to one of the network-facing ports 28 of any one or more of the DLCs (here, e.g., DLC 10-1 and DLC 10-2). In brief overview, the cell-based DLCs 10 redirect management and control packets that they receive over their network ports 28 to this control plane server 16-1 for processing. In the other direction, the control plane server 16-1 sends management and control packets to the DLCs 10 for transmission out through their network ports 28.

In other embodiments, the distributed fabric system 20 is partitioned into multiple non-overlapping switching domains; each switching domain being a different subset of one or more DLCs 10, a different subset of the network ports of one or more DLCs, or combinations thereof. Each switching domain can have its independent management and/or control planes running on one of the servers 16 coupled to a physical network port 28 of a DLC 10 in that switching domain.

Figure 3:
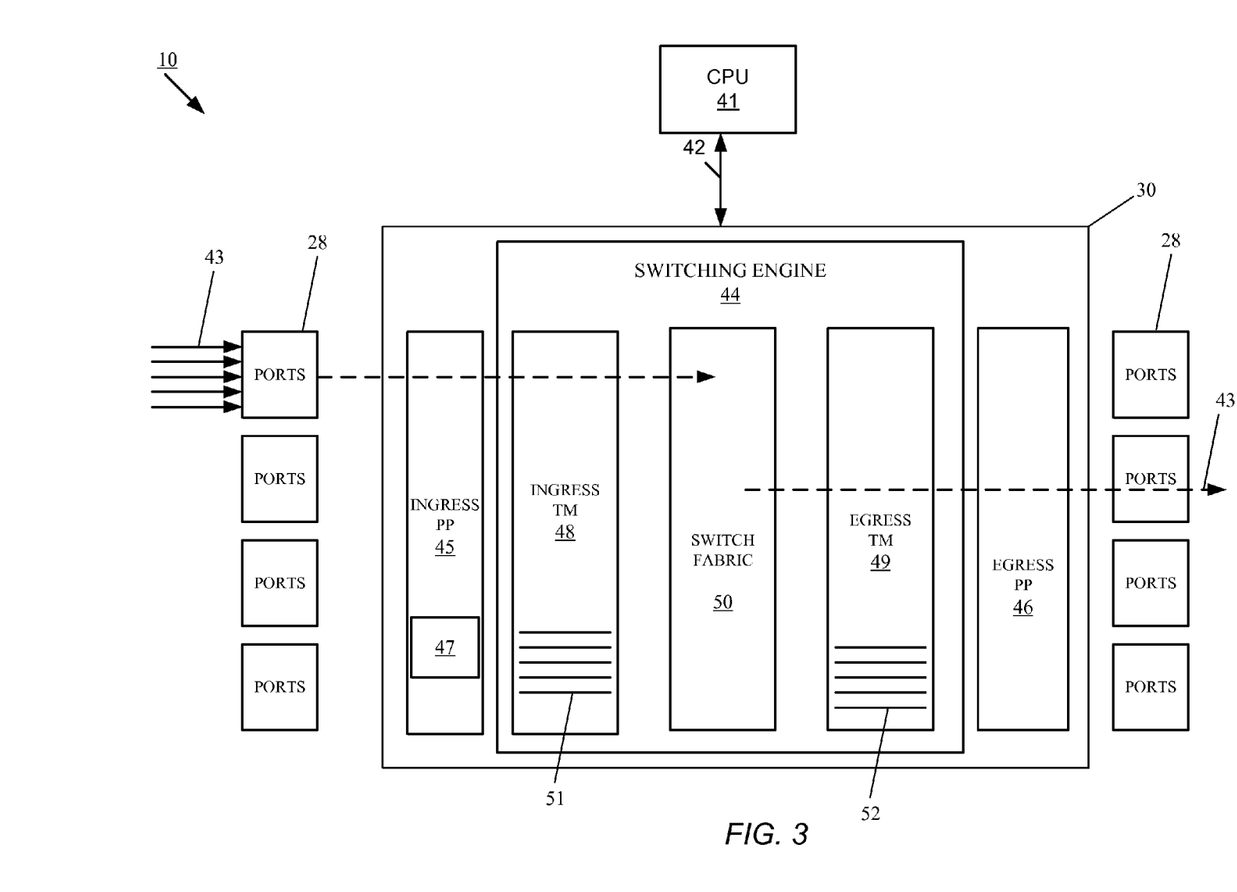
FIG. 3 is a block diagram of an embodiment of a switch.

FIG. 3 shows an embodiment of architecture for a DLC 10, including the physical network ports 28, one of the network processors 30, and a central processing unit (CPU) 41 in communication with the network processor 30 by a PCIe bus 42. The switching device (e.g., ASIC) of a DLC 10 usually supports hundreds of physical network ports 28, which can have, for example, 40G or 100G bandwidth capabilities. The physical network ports 28 generally share all processing and buffering resources of the switching device (e.g., ASIC) in the DLC 10. Packets 43 arriving at the DLC 10 come through the physical network ports 28 (in contrast to cells, which arrive and leave the DLC 10 on the switch fabric ports 32 and are not the focus of FIG. 3).

The network processor 30 includes a switching engine 44 and a packet processor having an ingress component (ingress packet processor) 45 and an egress component (egress packet processor) 46. The ingress packet processor 45 includes a look-up engine 47 that manages entries of one or more look up tables of the switching device used to make switching decisions. The switching engine 44 includes a switch fabric 50 and a traffic manager comprised of an ingress component (ingress TM) 48 and an egress component (output TM) 49.

The traffic manager associates each physical network port 28 with one system port. Each system port is a logical entity that is globally unique among all the DLCs 10 connected to same set of SFCs 12. The association between system ports and physical network ports 28 provides a mechanism for uniquely identifying physical network ports 28 within the distributed fabric system 20. Accordingly, any reference herein to a system port encompasses the specific physical network port 28 associated with that system port, and any reference to a physical network port 28 encompasses the globally unique system port associated with that physical network port.

The traffic manager also partitions the physical network ports 28 into virtual ports, referred to as ingress traffic manager (ITM) ports at the ingress side of the network processor 30 and as output traffic manager (OTM) ports at the egress side of the network processor 30. The traffic manager internally divides the resources of the switching device, such as its ingress and egress queues and buffers, among these virtual ports (i.e., the ITM and OTM ports). Each system port is mapped to one ITM port for the ingress TM 48 and to one OTM port for the egress TM 49. The look up table(s) maintain the mapping of physical network ports 28 to system ports, and system ports to ITM ports and OTM ports; all lookup table entries are based on either the OTM port or I™ port. In general, the traffic manager switches packets 43 across the ITM ports and OTM ports, and can manage (e.g., shape, condition, etc.) traffic at the individual virtual port (i.e., ITM, OTM) level.

The ingress and egress traffic managers 48, 49 manage temporary buffering of incoming packets 66 for preprocessing. The ingress TM 48 is independently programmable (i.e., microcode loaded through a microcode facility) to perform various traffic control operations (e.g., priority, buffering, traffic shaping and/or conditioning) based on the source virtual ports of the packets. The ingress TM 48 generates and manages ingress queues 51 (also referred to as virtual output queues or VOQs) for receiving the incoming packets 43. The ingress queues 51 are illustrated as horizontal lines within the ingress TM 51. Each VOQ 51 is exclusively associated with one of the OTM ports, and used exclusively for receiving packets to be switched to that OTM port. Like the ingress TM 48, the egress TM 49 is independently programmable (i.e., microcode loaded through a microcode facility) to perform various traffic control operations (e.g., priority, buffering, traffic shaping and/or conditioning) based on the destination virtual ports of the packets. The egress TM 49 generates and allocates egress queues 52 to the OTM ports, with each OTM port being allocated its own egress queue 52.

In addition, all the servers 16 (FIG. 1) connected to a physical network port 28 mapped to a system ports of the given DLC (e.g., 10-1) form a virtual POD (i.e., a Point Of Delivery). A virtual POD can be managed independently by running the control plane and/or management plane on one of the directly attached servers 16. The servers 16 of one virtual POD are isolated from servers 16 in another virtual POD; that is, servers 16 in different virtual PODs cannot send and receive packets from each other. Thus, an individual customer can own a virtual POD at a hosted data center. Each virtual POD within the distributed fabric system 20 provides complete feature set of the flat data center switch, but all virtual PODs share the same set of SFCs 12.

Each packet 43 arriving at a physical network port 28 is processed by the ingress logic (ingress packet processor 45 and ingress TM 48) of the associated system port. In brief, the ingress packet processor 72 performs conversions from source network ports 28 to ITM ports and from ITM ports to OTM ports, and the egress packet processor 74 performs conversions from OTM ports to destination network ports 28.

Each packet 43 arriving at a physical network port 28 has a header and a payload. The ingress packet processor 45 parses the packet 43. Based on information in the packet header, the look-up engine 47 of the ingress packet processor 45 determines the ITM port assigned to the packet. Based on this ITM port, the ingress packet processor 45 employs the look-up engine 47 to determine a destination physical network port 28 for the packet 43, and a destination OTM port and VOQ 52 for the packet based on the destination physical network port 28.

In addition, the ingress packet processor 45 adds a pre-classification header to each packet 43. Microcode logic of the network processor 30 determines the assigned ITM port based on information carried by certain (predetermined) fields in the packet (e.g., the S-tag in an Ethernet packet). The pre-classification header carries information about the ITM port. In one embodiment, the pre-classification header includes, but is not limited to, fields for the ITM port, the source VLAN, a QoS for the packet, statistics pointers, and the destination OTM port.

The ingress packet processor 45 can forward the packet 43 to the ingress TM 48 by placing the packet (or a pointer to that packet) into the VOQ 51 associated with the destination OTM port. Alternatively, the ingress TM 48 can move the packet 43 to the appropriate VOQ 51 based on the ITM port or OTM port in the pre-classification header of the packet.

The switch fabric 50 takes the packets from the VOQs 51 and switches them to the egress TM 49 based on the pre-classification header contents. In the transfer of packets from the ingress queues 51 to the egress queues 52, the ingress and egress packet processors 86, 88 can engage in a handshaking process. The ingress packet processor 45 signals to the egress packet processor 46 that it has a packet for transfer. In response, the ingress packet processor 45 receives credit. When sufficient credit is acquired, the ingress packet processor 45 sends the packet to the egress packet processor 46.

The egress TM 49 interacts with the OTM port to make sure the packets residing in the VOQs 51 are delivered to their destinations. For this operation, the packets 43 may leave the DLC 10 through the switch fabric ports 32 (FIG. 2), travel through the SFCs 12 in the form of cells, and return to the destination DLC (which can be the same as the source DLC) through its switch fabric ports 32, as described in connection with FIG. 2.

When packets 43 are to be sent out of the physical network ports 28, the egress packet processor 46 performs conversions from destination OTM ports to physical network ports 28, taking packets from the egress queues 52 and forwarding them to their destination physical network ports 28 based on the destination OTM ports. The egress packet processor 46 may remove the pre-classification header from each packet before forwarding that packet to a destination physical network port 28 (or the destination physical port 28 can remove the pre-classification header).

Figure 4:
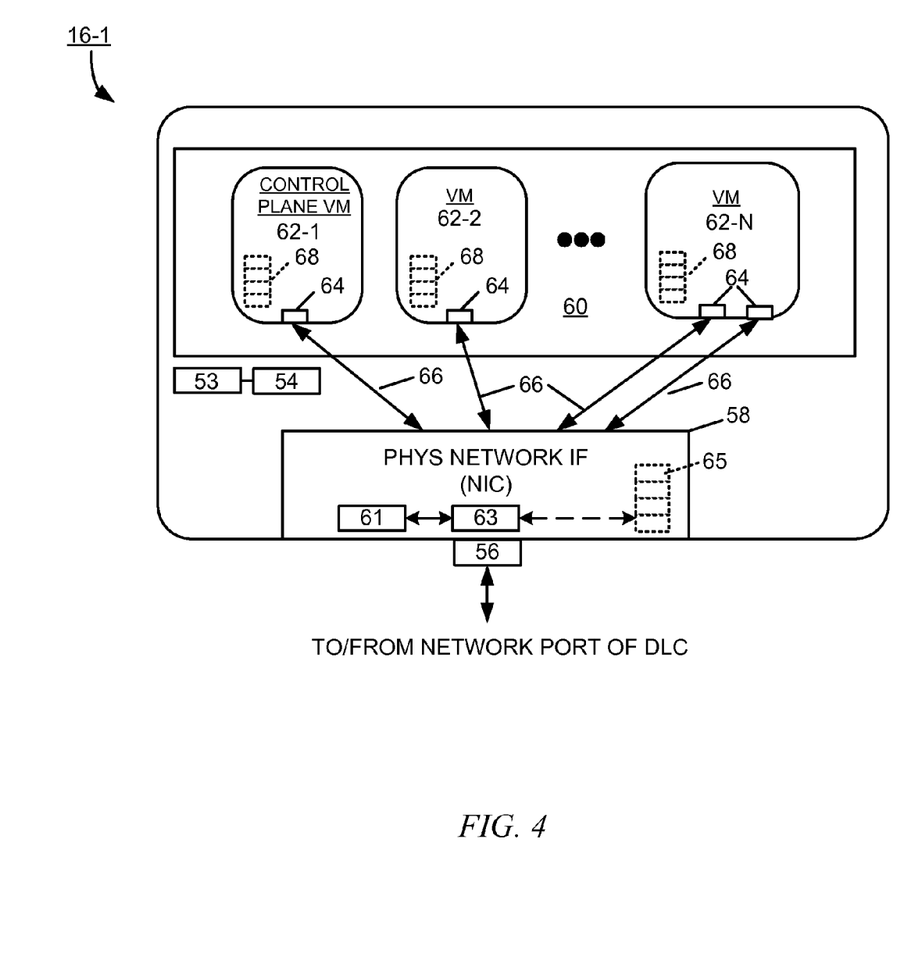
FIG. 4 is a block diagram of an embodiment of a server connected to a network port of one of the switches.

FIG. 4 shows a functional block diagram of an embodiment of the control plane server system 16-1, including hardware, such as one or more processors 53, system memory 54, one or more physical I/O ports 56, and a physical network interface 58. Virtualization software runs on the server system 16-1.

The virtualization software includes hypervisor software 60 for abstracting the hardware of the server system 16-1 into virtual machines 62-1, 62-2, 62-N (generally, 62). The hypervisor 60 can include switch software (i.e., a vswitch) for switching data units between virtual machines 62 on the server system 16-1. The server system 16-1 can run more than one hypervisor 60. Each virtual machine 62 includes at least one application (e.g., a database application) executing within its own guest operating system. Generally, any type of application can execute on a virtual machine. One of the virtual machines, here, for example, VM 62-1, is a control plane virtual machine configured to manage the control plane for a switching domain in the distributed fabric system 20. The principles described herein can extend to running the management plane for the switching domain on the same or on a different VM executing on the same or on a different server.

One or more virtual interfaces (VIF) 64, such as a virtual NIC, is associated with each virtual machine 64. Each VIF 64 has its own unique virtual MAC address (vMAC). For example, virtual machines 62-1, 62-2 both have one VIF 64, and virtual machine 62-N has two VIFs 64. VIFs 64 include those interfaces that handle data networking communications and storage communications. Through the hypervisor 60, the VIFs 64 are logically connected to the physical network interface 58, as signified by virtual links 66. The virtual links 66 can be implemented in software (as vswitches) or through PCI IOV Virtual functions. In addition, each virtual machine 62 is allocated system memory 68 from the system memory 54 of the server system 16-1.

An example of virtualization software for implementing virtual machines on a physical machine is VMware ESX Server™, produced by VMware® of Palo Alto, Calif. Other examples of virtualization software include XenSource™ produced by Citrix of Ft. Lauderdale, Fla., Hyper-V™ produced by Microsoft of Redmond, Wash., KVM produced by RedHat of Raleigh, N.C., Virtuozzo™ produced by SWsoft of Herndon, Va., and Virtual Iron produced by Virtual Iron Software of Lowell, Mass.

The physical network interface 58 of the server 16-1 connects to a network port 28 of one or more of the DLCs 10 through one of the physical I/O ports 56. As used herein, the physical network interface 58 is generally a network I/O device that provides support in hardware, software, or a combination thereof for any form of I/O virtualization. Examples of the physical network interface include, but are not limited to, SR-IOV NICs and non-SR-IOV NICs, multi-queue NICs, network interface controllers, I/O adapters, and converged network adapters. In addition to handling the network I/O to and from the DLC 10, the physical network interface 58 provides a communication path between virtual machines 62.

The physical network interface 58 includes a processing element 61 and a MAC address lookup table 63 for maintaining the MAC addresses of the virtual machines 62 running on the server system 16-1. The lookup table 63 can be implemented in hardware. In one embodiment, the physical network interface 58 includes memory 65 (shown in dashes) for buffering data units received from a source virtual machine and awaiting forwarding to a destination virtual machine.

Figure 5:
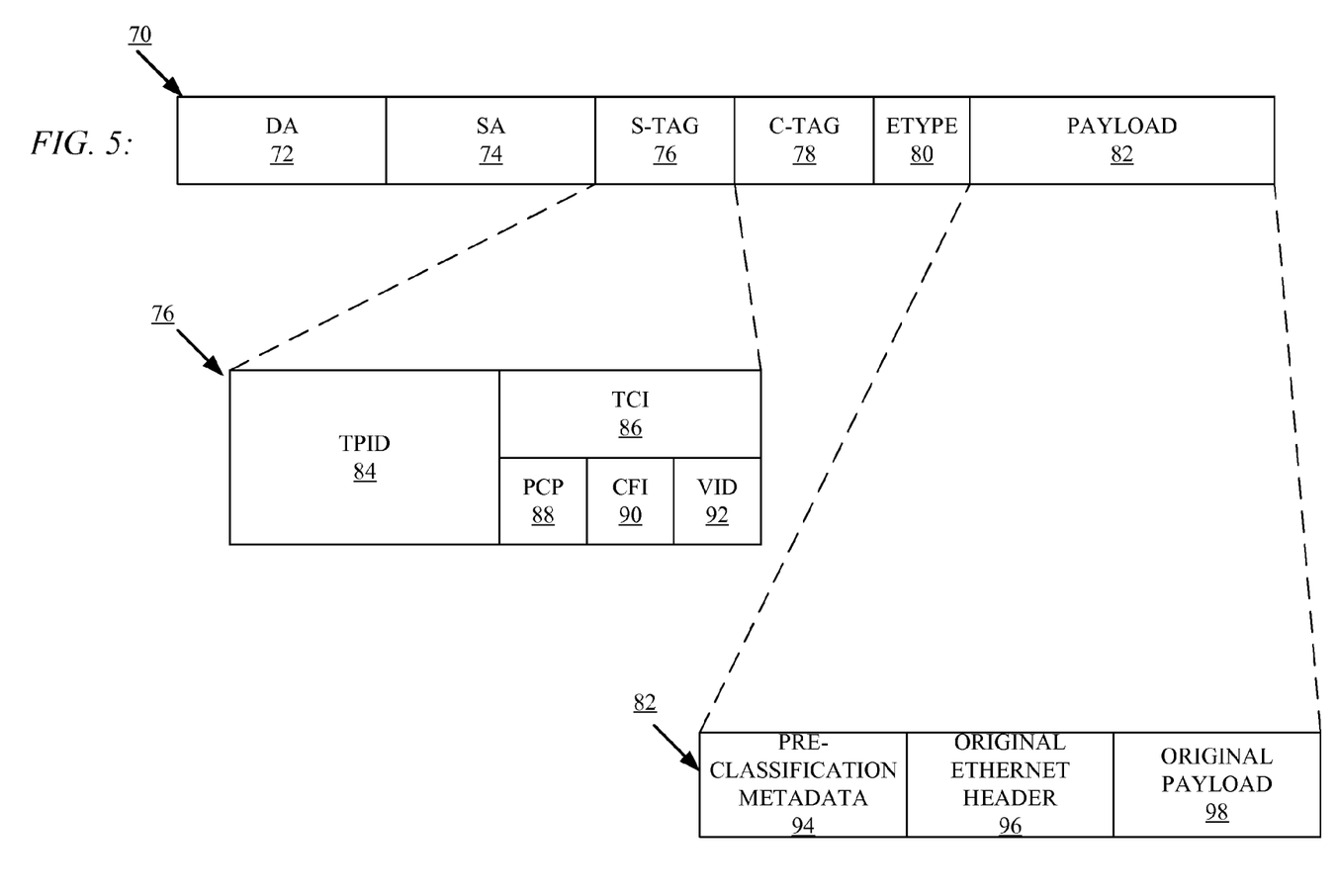
FIG. 5 is a diagram of an embodiment of an encapsulated protocol control packet, with an S-tag field and a modified payload field.

FIG. 5 shows an embodiment of a frame format 70 used by the microcode of the DLC 10 to produce a protocol control packet. In one embodiment, the frame format is a standard Ethernet Q-in-Q frame format that includes a destination address field 72, a source address field 74, an S-tag (service tag) field 76, an optional C-tag (customer tag) field 78, an Ethertype field 80, and payload 82. In one embodiment, the S-tag field 76 can be used to identify the s-channel of the server system (controller) 16-1. The destination address field 72 contains the MAC address of the control plane VM 62-1 (FIG. 4) running on the controller 16-1.

The s-tag field 76 includes a TPID field 84 and a TCI field 86. The TPID field 84 is a 16-bit field set to a value that identifies the packet as an IEEE 802.1Q-tagged packet. The TCI field 86 includes a 3-bit field a PCP (Priority Code Point) field 88, which indicates a frame priority level, a 1-bit CFI field 90 to indicate packets eligible for dropping, and a 12-bit VID (VLAN Identifier) field 92 for specifying the VLAN to which the packet belongs. As described herein, the DLCs and SFCs of the distributed fabric system 20 use the VID field 92 to carry the s-tag value provided by the control-plane VM 62-1 running on the server 16-1. The optional C-tag field 78, when used, has the same fields as the s-tag 76, and can alternatively be used to carry the s-tag value provided by the server 16-1 when the s-tag 76 is being used for other purposes.

The payload 82 includes a pre-classification metadata field 94, the original Ethernet header 96, and the original payload 98. The original Ethernet header 96 and original payload 98 comprise the protocol control packet received and encapsulated by the DLC 10 for transmission to the server 16-1.

Figure 6:
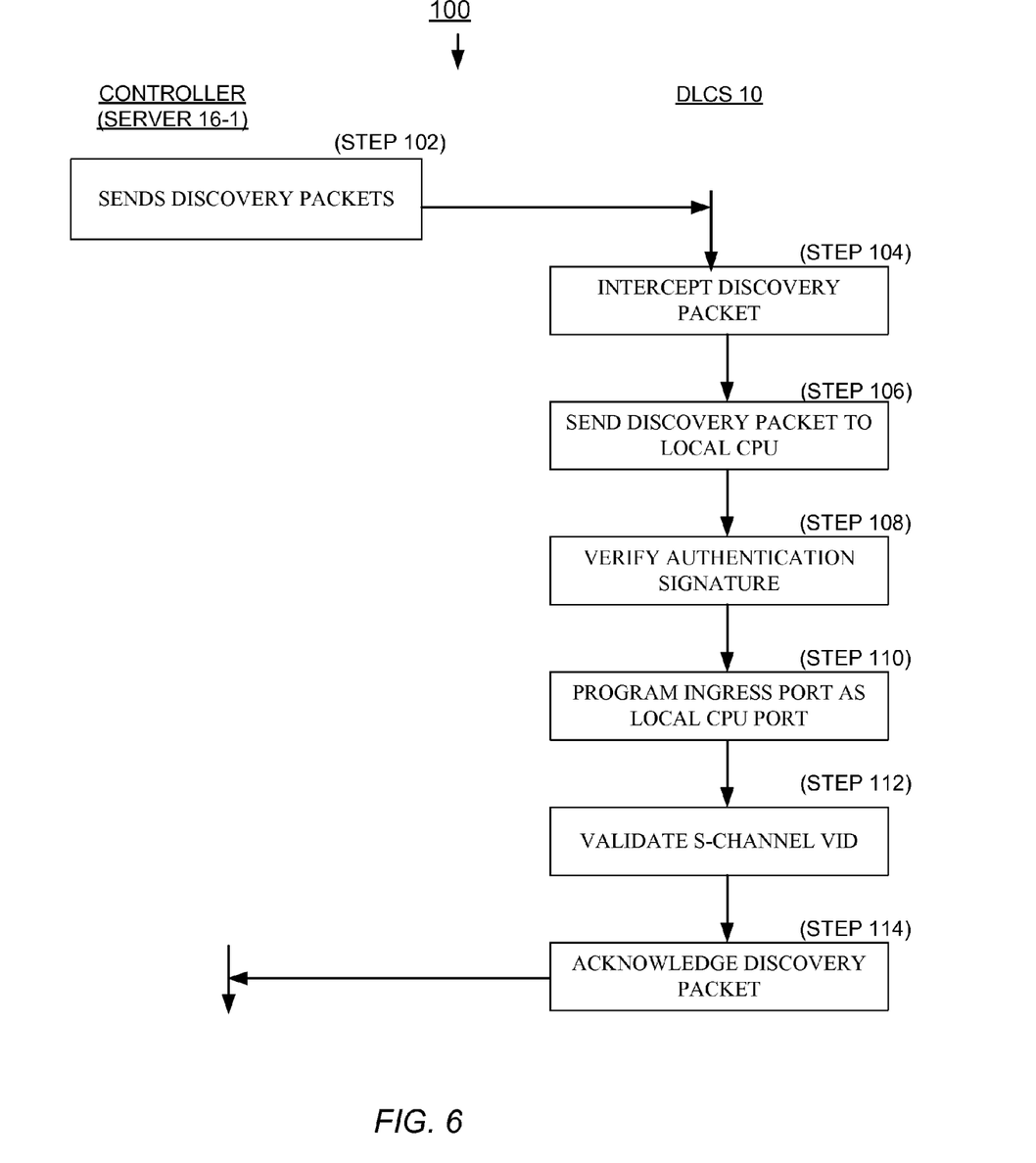
FIG. 6 is a flow diagram illustrating an embodiment of a process for configuring the switches of the distributed fabric system to send protocol control packets to the server running the control plane.

FIG. 6 shows an embodiment of a process 100 for configuring the DLCs 10 to send protocol control packets to the control plane server 16-1. After the DLCs 10 initialize, the control plane VM 62-1 of the controller 16-1 sends (step 102) discovery packets to the distributed fabric system 20 through the DLC 10-2 (for example). The discovery packets can unicast or multicast. If the packets are multicast, the CPUs 42 on all the DLCs 10 and SFCs 20 are members of the multicast group. The discovery packets contain various details, including details about the controller 16-1, static s-channel details for the control plane VM 62-1, an encrypted authentication signature, and software image release number information. The DLCs 10 intercept (step 104) these discovery packets, identify the local ingress port (P), and learn other information from the packets. In this example, the local ingress port (P) is a network port 28 of the DLC 10-2 (i.e., the network port 28 that is connected to the server 16-1 running the control plane). Each DLC 10 sends (step 106) the intercepted discovery packet to its local CPU 42 on the PCIe bus 44. The local CPU 42 verifies (step 108) the packet authentication signature.

After the authentication, the DLC 10 programs (step 110) the ingress network port (P) 28 as its local CPU port. The microcode on the switch 10 checks (step 112) the validity of the static s-channel provided in the discovery packet. Henceforth, the microcode adds an s-tag with the s-channel VID to all protocol control packets copied to CPU 41. This s-tag enables the hypervisor 60 on the controller 16-1 to see and forward the packet to the proper destination MAC address, which corresponds to the control plane VM 62-1 on the controller 16-1. At step 114, each DLC 10 acknowledges the discovery packet and completion of the operation. Subsequently, all protocol control packets, which are supposed to be copied to CPU 41 for protocol processing, are instead sent over the network port (P) 28 and eventually to the control plane VM 62-1 through the hypervisor 60.

Figure 7A:
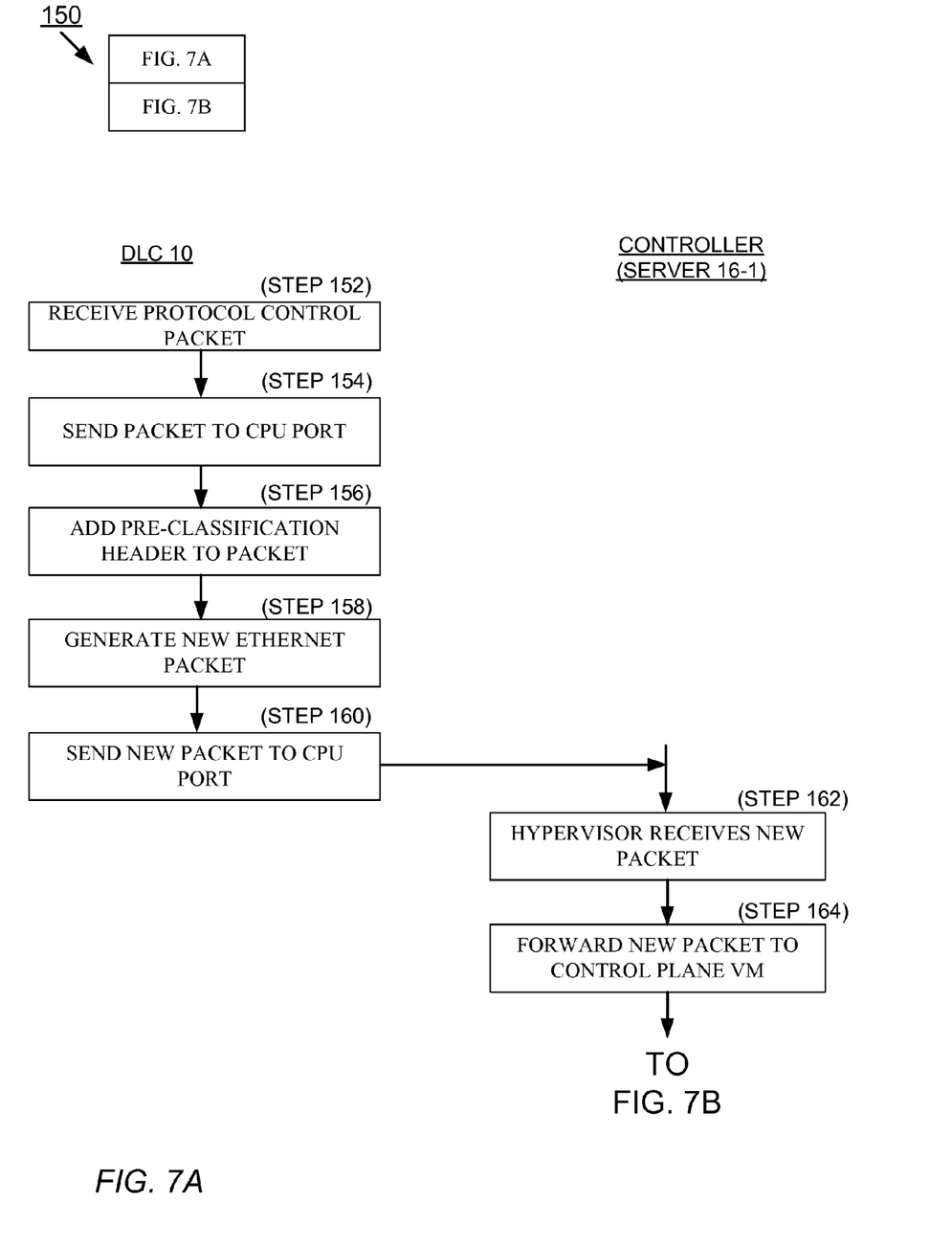
FIG. 7A and FIG. 7B are a flow diagram illustrating an embodiment of a process for processing protocol control packets received by a switch of the distributed fabric system.
Figure 7B:
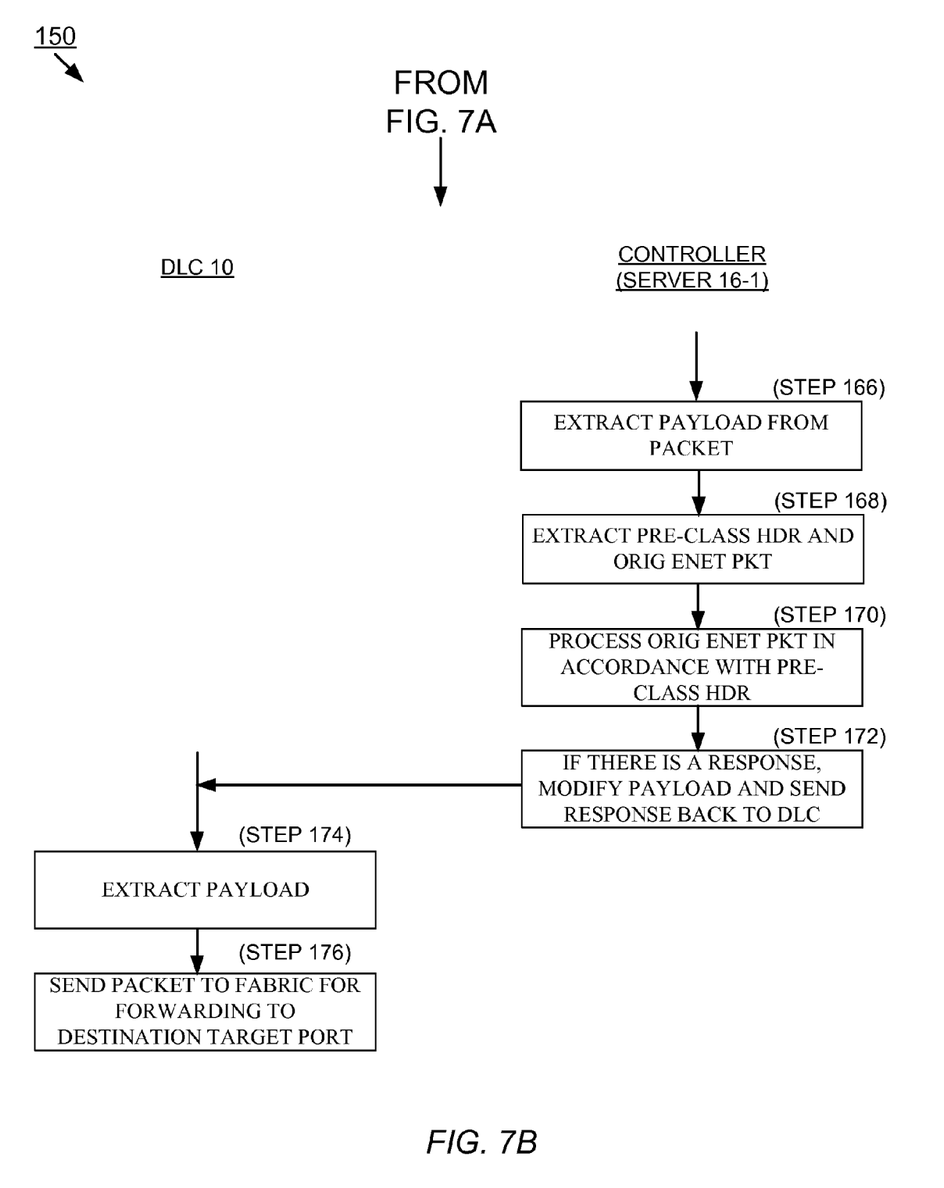

FIG. 7A and FIG. 7B show an embodiment of a process 150 for processing protocol control packets received by a DLC 10 of the distributed fabric system 20. In the description of the process 150, reference is made also to elements of FIG. 3, FIG. 4, and FIG. 5. A protocol control packet arrives (step 152) on a network port 28 of a DLC 10. The protocol control packet causes an exception within the DLC 10, and, in response, the packet processor 45 (FIG. 3) determines (step 154) to send the packet to the CPU port. This CPU port is reprogrammed during the discovery phase to be an ingress network port 28 of one of the DLCs 10.

In preparation to sending the packet to the CPU port, the packet processor 45 adds (step 156) pre-classification metadata 94 (FIG. 5) to the protocol control packet. The combination of the pre-classification metadata 94 with the protocol control packet produces the payload 82 for a new packet. The packet processor 45 produces (step 158) a new Ethernet packet 70 with an s-tag 76 and new payload (i.e., with the metadata) 82. The s-tag 76 is the static s-tag sent by the control plane VM 62-1 in the discovery phase described in connection with FIG. 6. The traffic manager 49 (FIG. 3) sends (step 160) the new Ethernet packet to the CPU port (i.e., the network port 28 programmed as the CPU port).

At step 162, the hypervisor 60 running on the server system 16-1 receives the new Ethernet packet 70. The hypervisor 60 forwards (step 164) the new Ethernet packet 70 to the control plane VM 62-1 in response to the s-tag 76 and the destination MAC address 72 (FIG. 5). The control plane VM 62-1 receives the packet and extracts (step 166) the payload 82 and, from the payload 82, extracts (step 168) the pre-classification header 94 and the Ethernet packet (comprised of the original Ethernet header 96 and original payload 98). The control plane VM 62-1 processes (step 170) the extracted packet in accordance with the pre-classification header information 94.

If a response packet is required, the control plane VM 62-1 modifies (step 172) the payload 82 with the response, updating the pre-classification metadata 94 in accordance with the target port, packet type details, and required treatment details, and sends the response to the network port 28 of the DLC 10. The DLC 10 receives the response packet and extracts (step 174) the response payload, which contains the pre-classification metadata 94 and the response Ethernet packet. The packet processor 45, 46 and traffic manager 48, 49 process and send (step 176) the response packet towards the target port through the switching fabric 22 (FIG. 2).

As will be appreciated by one skilled in the art, aspects of the present invention may be embodied as a system, method, and computer program product. Thus, aspects of the present invention may be embodied entirely in hardware, entirely in software (including, but not limited to, firmware, program code, resident software, microcode), or in a combination of hardware and software. All such embodiments may generally be referred to herein as a circuit, a module, or a system. In addition, aspects of the present invention may be in the form of a computer program product embodied in one or more computer readable media having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired, optical fiber cable, radio frequency (RF), etc. or any suitable combination thereof.

Computer program code for carrying out operations for aspects of the present invention may be written in any combination of one or more programming languages, including an object oriented programming language such as JAVA, Smalltalk, C++, and Visual C++ or the like and conventional procedural programming languages, such as the C and Pascal programming languages or similar programming languages. The program code may execute entirely on the user's computer, partly on the user's computer, as a stand-alone software package, partly on the user's computer and partly on a remote computer or entirely on the remote computer or server. In the latter, the remote computer may be connected to the user's computer through any type of network, including a local area network (LAN) or a wide area network (WAN), or the connection may be made to an external computer (for example, through the Internet using an Internet Service Provider).

The program code may execute entirely on a user's computer, partly on the user's computer, as a stand-alone software package, partly on the user's computer and partly on a remote computer or entirely on a remote computer or server. Any such remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Aspects of the described invention may be implemented in one or more integrated circuit (IC) chips manufactured with semiconductor-fabrication processes. The maker of the IC chips can distribute them in raw wafer form (on a single wafer with multiple unpackaged chips), as bare die, or in packaged form. When in packaged form, the IC chip is mounted in a single chip package, for example, a plastic carrier with leads affixed to a motherboard or other higher level carrier, or in a multichip package, for example, a ceramic carrier having surface and/or buried interconnections. The IC chip is then integrated with other chips, discrete circuit elements, and/or other signal processing devices as part of either an intermediate product, such as a motherboard, or of an end product. The end product can be any product that includes IC chips, ranging from electronic gaming systems and other low-end applications to advanced computer products having a display, an input device, and a central processor.

Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It is be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method for implementing a control plane in a distributed fabric system comprised of one or more switching domains, the distributed fabric system including a plurality of network switches coupled to a cell-based switching fabric, the method comprising:
    running a virtual machine on a server connected to a network port of one or more of the network switches of the distributed fabric system that are members of a given switching domain;
    managing, by the virtual machine running on the server, a control plane for the one or more network switches of the given switching domain;
    receiving, by the server, a protocol control packet from one of the network switches that is a member of the given switching domain; and
    forwarding the received protocol control packet to the virtual machine running on the server for processing.

2. The method of claim 1, further comprising reprogramming, by each network switch that is a member of the given switching domain, a local CPU port of that network switch to be an ingress network port; and
    wherein transmitting, by each network switch, a protocol control packet to the server includes forwarding, by that network switch, the protocol control packet to the local CPU port reprogrammed to be the ingress network port.

3. The method of claim 2, wherein the ingress network port is the network port to which the server is connected.

4. The method of claim 1, further comprising transmitting, by the virtual machine managing the control plane, discovery packets to members of the switching domain.

5. The method of claim 4, wherein the discovery packets include a tag to be added to each protocol control packet transmitted by one of the network switches to the control plane VM running on the server.

6. The method of claim 1, further comprising authenticating, by each network switch, the control plane virtual machine in response to a discovery packet received from the control plane virtual machine.

7. The method of claim 1, further comprising managing a management plane for the given switching domain on a virtual machine running on a server connected to a network port of one or more of the network switches of the distributed fabric system that are members of the given switching domain.

8. A distributed fabric system comprising:
    a plurality of scaled-out fabric coupler (SFC) chassis, each SFC chassis having a plurality of cell-based SFC fabric ports and a cell-based fabric element for switching cells among the cell-based SFC fabric ports of that SFC chassis; and
    a plurality of switching distributed line cards (DLCs), each switching DLC having a plurality of network ports and a plurality of DLC fabric ports, each switching DLC being connected to each of the SFC chassis by one of the DLC fabric ports of that switching DLC, at least one of the DLCs belonging to a switching domain; and a server connected to one of the network ports of the at least one DLC belonging to the switching domain, the server running a control plane virtual machine that manages a control plane for the at least one DLC belonging to the switching domain.

9. The distributed fabric system of claim 8, wherein each DLC in the switching domain is configured to reprogram its local CPU port to be an ingress network port and thereby to redirect forwarding of protocol control packets to the ingress network port.

10. The distributed fabric system of claim 9, wherein the ingress network port is the network port to which the server is connected.

11. The distributed fabric system of claim 8, wherein the control plane virtual machine is configured to transmit discovery packets to members of the switching domain.

12. The distributed fabric system of claim 11, wherein the discovery packets include a tag to be added to each protocol control packet transmitted by each network switch in the switching domain to the control plane VM running on the server.

13. The distributed fabric system of claim 8, wherein each DLC in the switching domain is configured to authenticate the control plane virtual machine in response to a discovery packet received from the control plane virtual machine.

14. A server system comprising:
   a physical network interface card (NIC) connected to a network port of a given network switch of a cell-based distributed fabric system comprised of a plurality of network switches coupled to a cell-based switching fabric, the given network switch belonging to a switching domain within the cell-based distributed fabric system;
   a hypervisor in communication with the physical NIC, the hypervisor including a plurality of virtual NICs;
   a processor running a control plane virtual machine (VM) associated with one of the virtual NICs, the control plane VM managing a control plane for the given network switch belonging to the switching domain.

15. The server system of claim 14, wherein the control plane VM transmits discovery packets from the physical NIC to each network switch in the switching domain.

16. The server system of system of claim 15, wherein the discovery packets include a tag to be added to each protocol control packet transmitted by each network switch in the switching domain to the control plane VM running on the server.

17. The server system of claim 16, wherein the hypervisor, in response to the tag, forwards each protocol control packet received by the server system to the control plane VM for processing.

18. A network switch, comprising:
   a central processing unit (CPU);
   a switching chip having a plurality of network ports, the switching chip having logic configured to detect and forward protocol control packets received by the network switch to the CPU through a local CPU port, logic configured to reprogram the local CPU port to be a network port, and logic to forward protocol control packets to the network port rather than to the CPU.

19. The network switch of claim 18, further comprising the network port, which is connected to a server running a control plane virtual machine.

20. The network switch of claim 18, further comprising logic configured to intercept a discovery packet sent by a server running a control plane virtual machine, and wherein the logic configured to reprogram the local CPU port operates in response to the discovery packet.

21. The network switch of claim 20, wherein the discovery packet includes a tag associated with the server, and further comprising logic configured to include the tag in each protocol control packet forwarded to the network port.

22. A computer program product for implementing a control plane in a distributed fabric system comprised of one or more switching domains, the distributed fabric system including a plurality of network switches coupled to a switching fabric by cell-based fabric ports, the computer program product comprising:
   a computer-readable storage medium having computer-readable program code embodied therewith, the computer-readable program code comprising:
   computer-readable program code configured to provide a virtual machine when executed on a server system;
   computer-readable program code configured to manage, by the virtual machine when executed, a control plane for one or more of the plurality of network switches that belong to a given switching domain of the distributed fabric system;
   computer-readable program code configured to receive a protocol control packet from one of the network switches that belong to the given switching domain; and
   computer-readable program code configured to forward the received protocol control packets to the virtual machine when executing on the server system and managing the control plane for the given switching domain.

23. The computer program product of claim 22, further comprising computer-readable program code configured to transmit, by the virtual machine when executed on the server system, discovery packets to members of the switching domain.

24. The computer program product of claim 23, wherein the discovery packets include a tag to be added to each protocol control packet transmitted by one of the network switches to the VM running on the server.

25. The computer program product of claim 24, further comprising computer-readable program code configured to forward each protocol control packet received by the server system to the VM, in response to the tag in that protocol control packet.

* * * * *